United States Patent
Roelke et al.

(10) Patent No.: US 8,508,351 B2
(45) Date of Patent: Aug. 13, 2013

(54) METHOD FOR WARNING THE DRIVER OF A MOTOR VEHICLE OF INCREASED RISK OF AN ACCIDENT

(75) Inventors: Volker Roelke, Leonberg (DE); Jascha Freess, Obersulm (DE); Michael Knoop, Ludwigsburg (DE); Tobias Rentschler, Pforzheim (DE)

(73) Assignee: Robert Bosch GmbH, Stuttgart (DE)

( * ) Notice: Subject to any disclaimer, the term of this patent is extended or adjusted under 35 U.S.C. 154(b) by 541 days.

(21) Appl. No.: 12/733,654

(22) PCT Filed: Sep. 8, 2008

(86) PCT No.: PCT/EP2008/061851
§ 371 (c)(1),
(2), (4) Date: Sep. 22, 2010

(87) PCT Pub. No.: WO2009/037139
PCT Pub. Date: Mar. 26, 2009

(65) Prior Publication Data
US 2011/0001617 A1    Jan. 6, 2011

(30) Foreign Application Priority Data
Sep. 13, 2007 (DE) .......... 10 2007 043 604

(51) Int. Cl.
*B60Q 1/00*    (2006.01)

(52) U.S. Cl.
USPC .......................................... 340/438; 340/436

(58) Field of Classification Search
USPC .................................... 340/436, 438
See application file for complete search history.

(56) References Cited

U.S. PATENT DOCUMENTS

| | | | | |
|---|---|---|---|---|
| 6,338,022 | B1 * | 1/2002 | Shinmura et al. | 701/301 |
| 6,657,539 | B2 * | 12/2003 | Yamamoto et al. | 340/438 |
| 6,940,448 | B2 * | 9/2005 | Knoop et al. | 342/70 |
| 7,145,441 | B2 * | 12/2006 | Knoop et al. | 340/435 |
| 7,515,056 | B2 * | 4/2009 | Knoop et al. | 340/576 |
| 7,734,416 | B2 * | 6/2010 | Yano et al. | 701/301 |
| 7,778,753 | B2 * | 8/2010 | Fujiwara et al. | 701/41 |
| 2007/0129891 | A1 * | 6/2007 | Yano et al. | 701/301 |

FOREIGN PATENT DOCUMENTS

| | | |
|---|---|---|
| DE | 100 29 874 | 1/2001 |
| DE | 10 2004 030 756 | 1/2006 |
| EP | 0 943 515 | 11/2003 |
| WO | WO 2006/000482 | 1/2006 |

* cited by examiner

*Primary Examiner* — Travis Hunnings
(74) *Attorney, Agent, or Firm* — Kenyon & Kenyon LLP

(57) ABSTRACT

In a method for warning the driver of a motor vehicle, the yaw rate is altered in the event of an increased risk of an accident, and the change in the yaw rate serves to warn the driver of the increased risk state.

19 Claims, 1 Drawing Sheet

METHOD FOR WARNING THE DRIVER OF A MOTOR VEHICLE OF INCREASED RISK OF AN ACCIDENT

BACKGROUND OF THE INVENTION

1. Field of the Invention

The present invention relates to a method for warning the driver of a motor vehicle of an increased risk of an accident.

2. Description of Related Art

Published German patent document DE 10 2004 030 756 A1 describes a method for kinesthetic warning of the driver of a motor vehicle in situations where there is an increased risk of a collision. The motor vehicle is equipped with an object detection sensor, which is designed as a radar sensor, an ultrasonic sensor or a video sensor, for example, and this makes it possible to ascertain the distance and relative speed of an object with respect to one's own vehicle. In conjunction with additional input data, e.g., one's own vehicle speed, a hazard value for a collision with a corresponding object may be ascertained therefrom. When there is an increased risk of a collision, the brake mechanism is automatically triggered in the vehicle to warn the driver, and a braking jolt, which is discernible by the driver, is generated. This effectively attracts the driver's attention.

BRIEF SUMMARY OF THE INVENTION

An object of the present invention is to prompt the driver of a motor vehicle, whenever there is an increased risk of an accident, to take measures to prevent the accident or to reduce the severity of the accident.

In the method according to the present invention, the driver is warned of an imminent accident by a kinesthetic method, the approach of said accident being ascertained with the help of an accident detection unit in the motor vehicle. The driver is warned by an alteration in a driving state variable in the motor vehicle, in particular in a sudden or jerky manner, to prompt the driver to make an appropriate response. According to the present invention, it is provided that the yaw rate or a state variable correlating with the yaw rate is altered as the driving state variable. However, to minimize the influence of the automatically altered yaw rate on driving dynamics, the change in the yaw rate is below a predefined or calculated upper limiting value. This ensures that the driver is warned, on the one hand, and, on the other hand, the warning has no effect, or at least no significant effect, on the transverse dynamics of the vehicle. The influence on transverse dynamics is reserved for the driver's response. On the other hand, the change in the yaw rate is preferably above a predefined, i.e., calculated, lower limiting value to ensure that the change in the yaw rate will be noticed by the driver and perceived as a warning signal.

This procedure is fundamentally based on the idea of drawing the driver's attention intuitively to an unusual situation, namely an approaching accident. The driver perceives the intervention in the yaw rate and perceives this intervention as a warning, namely with the shortest possible response time. Because of the direct correlation between the characteristic of the warning and the required action, the driver will intuitively take the measure that is suitable for preventing the accident or reducing the severity of the accident. Since the warning occurs as a change in the yaw rate, the driver will take a steering action, so that the warning generated via the change in the yaw rate is intensified by the driver through an appropriate change in steering angle. The driver is thus ultimately responsible for the intervention in the transverse dynamics of the vehicle.

The time characteristic of the warning signal may be implemented in different ways. For example, the change in the yaw rate may correlate with the anticipated severity of the accident, so that the greater the anticipated damage, the stronger the warning signal turns out to be. Cumulatively or alternatively, the warning signal may also be linked to the probability of an accident, in such a way that with an increase in the probability of an accident, the intensity of the warning signal also increases. In any case, however, it is advantageous that the warning signal, i.e., the change in the yaw rate, is below the predefined or calculated upper limiting value.

According to another advantageous embodiment, the yaw rate is altered only for the case when the probability of the predicted accident exceeds a threshold value. This condition ensures that a warning signal is generated only when an accident is seriously anticipated, whereas when the probability of an accident is very low, no such warning signal is generated in order not to unnecessarily irritate the driver.

The change in the yaw rate may also be subjected to additional conditions. It may be advantageous for the rising gradient by which the yaw rate is increased to be maximized so that, when seen over time, a pulse-like change in the yaw rate is implemented. It may likewise be advantageous to also maximize the time-dependent falling gradient by which the yaw rate is reduced again. On the whole, this results in a yaw rate pulse with a sudden increase or decrease in the yaw rate change.

For safety reasons, the yaw rate is altered only in stable driving states to prevent further destabilization from occurring in an unstable driving state. For example, the sideslip angle of the motor vehicle is considered to be a measure of the stability of the driving state, a change in the yaw rate being implemented only when the sideslip angle is below an acceptable limiting value.

The yaw rate is advantageously altered as a function of the moment of inertia of the vehicle about the vertical axis and the yaw moment. Technically, the change in the yaw rate may be implemented by decelerating at least one vehicle wheel in a targeted manner. However, it is also possible to influence wheel torques on the wheels on one axle via a so-called torque vectoring adjuster, by which torques are shifted from one wheel to the other wheel on the same axle. The torque vectoring adjuster is a differential gear having an actively operable clutch, for example. Furthermore, active steering systems may be used to generate the change in the yaw rate, e.g., an AFS (active front steering) with which an additional steering angle is adjustable on the front axle, or a rear-axle steering system with which an additional steering angle is adjustable on the steerable wheels of the rear axle.

The information about the direction in which the transverse dynamic movement of the vehicle must be altered to contribute toward avoidance of an accident or reducing the consequences of an accident is advantageously supplied via the accident detection unit in the motor vehicle. Accordingly, the change in the yaw rate is performed with an increase or decrease in the yaw angle.

If there are multiple active control systems in the vehicle by which a change in the yaw rate is achievable, then a plurality of control systems may also be used at the same time for implementation of the yaw pulse. The dead time between the point in time of accident detection and triggering of the yaw pulse may thus be minimized, and a high rising gradient of the yaw pulse may be achieved. Furthermore, feedback effects on the steering wheel, which could otherwise irritate the driver, may be avoided.

DETAILED DESCRIPTION OF THE INVENTION

Figure 1:
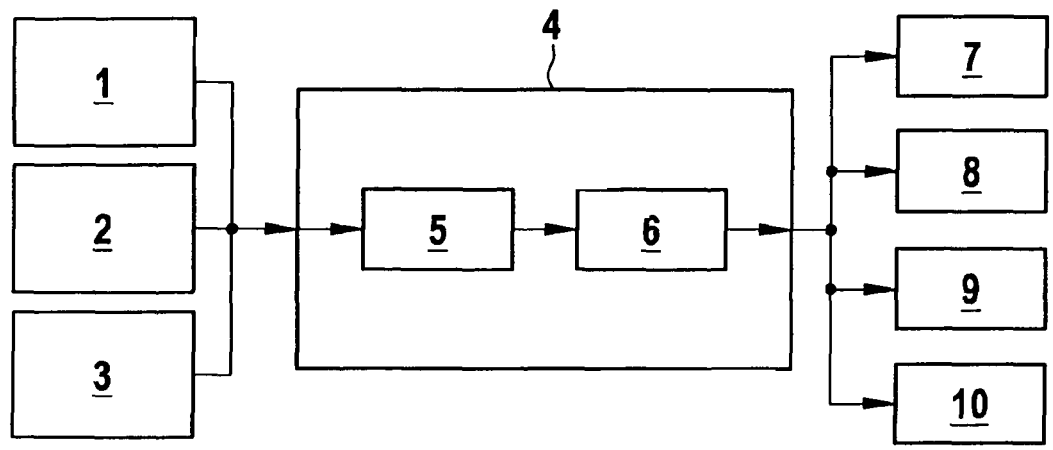
FIG. 1 shows a block diagram with the various phases of the method according to the present invention for warning the driver in the event of an increased risk of an accident.

The flow chart according to FIG. 1 shows that in a first method step 1, the risk of an imminent collision or another accident is detected with the help of a vehicle accident detection unit. Accident detection units, e.g., radar, ultrasound or infrared sensors and video-based systems, are used for this purpose. These systems may also be used according to method step 2 to detect whether the vehicle is leaving the predefined roadway or lane. In addition or as an alternative to the aforementioned noncontact detection units, GPS (Global Positioning Systems) may also be used for determining the position of a vehicle in conjunction with an electronically stored road map.

In another method step 3, the driving state of the motor vehicle is determined using extra sensors provided in the sensor system, e.g., acceleration sensors and yaw rate sensors, the driving state possibly also being ascertained by calculation, if necessary, e.g., by so-called observer models.

The data collected in method steps 1 through 3 are processed in a regulating or control unit 4 in which a decision is made about additional measures. Method steps 5 and 6, which are performed in regulating or control unit 4, are shown as examples; first, in method step 5, a decision is made as to whether a warning to the driver is to be issued in the form of a yaw pulse or a change $\Delta\omega$ in yaw rate $\dot{\psi}$ based on the data and information collected and analyzed. If a decision in favor of a warning has been made, an active actuator in the motor vehicle is selected in subsequent method step 6, its triggering possibly influencing the transverse dynamics of the vehicle and thus also the yaw rate.

These actuators are represented in method steps 7 to 10. Method step 7, for example, involves the triggering of an active brake system, which generates a wheel braking torque $M_B$ on at least one vehicle wheel. It is possible in this way to generate a yaw torque $M_z$ about vertical axis z of the vehicle. The size of wheel brake torque $M_B$ may be ascertained from a desired yaw torque characteristic according to the equation:

$$M_B = M_z \frac{2 r_R}{b}$$

as a function of wheel radius $r_R$ and track width b.

Alternatively or cumulatively, according to method step 8, wheel torques $M_R$ on one vehicle axle may also be influenced by a so-called torque vectoring adjuster by which torques are shifted from one wheel to the other wheel on the same axle. Wheel torque $M_R$ to be shifted is obtained as follows as a function of desired yaw torque characteristic $M_z$ $$M_R = \pm M_z \frac{r_R}{b},$$

where wheel torque $M_R$ is to be subtracted from the wheel on one side of the axle and added to the opposite wheel on the same axle.

According to another alternative, which is represented in method step 9, an active front-axle steering system is triggered, with which an additional steering angle $\Delta\delta$ is ascertained as a function of desired yaw torque characteristic $M_z$ according to the equation:

$$\Delta\delta = \frac{1}{c_{\alpha V} l_V \cos\delta} M_z$$

as a function of skew steepness $c_{\alpha V}$ of the front axle, distance $l_V$ between the front axle and the center of gravity of the vehicle, and steering angle $\delta$.

Furthermore, for the case when the motor vehicle is equipped with an active rear-axle steering system, it is also possible to trigger this system (method step 10). To this end, an additional steering angle $\Delta\delta_R$ in the rear-axle steering system is ascertained according to the equation $$\Delta\delta_R = \frac{1}{c_{\alpha R} l_R \cos\delta_R} M_z$$

as a function of skew steepness $c_{\alpha R}$ of the rear axle, distance $l_R$ between the rear axle and the center of gravity of the vehicle, and steering angle $\delta_R$ in the rear-axle steering system.

Figure 2:
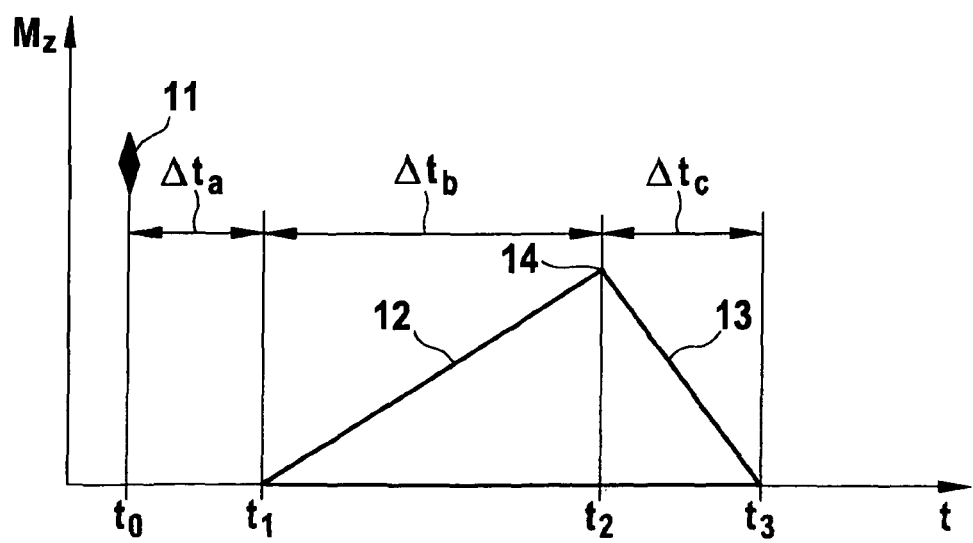
FIG. 2 shows a diagram of the yaw torque as a function of time, the area beneath the yaw moment representing a measure of the change in the yaw rate.

To generate the yaw pulse or change $\Delta\omega$ in yaw rate $\dot{\psi}$, the area under the desired curve of yaw torque $M_z$ is integrated according to the following equation, as illustrated in the curve according to FIG. 2:

$$\Delta\omega = \frac{1}{J_z} \int_{t_1}^{t_3} M_z dt$$

where $J_z$ denotes the moment of inertia of the vehicle about vertical axis z.

Integration of yaw torque $M_z$ is performed between two points in time $t_1$ and $t_3$ between which a yaw torque >0 should exist in the exemplary embodiment according to FIG. 2.

An event identified with reference numeral 11, taking place at point in time $t_0$ and representing the accident detection performed in the accident detection unit in the motor vehicle, is also entered into FIG. 2. The period of time identified as $\Delta t_a$ between detection of the accident at point in time $t_0$ and the buildup of the yaw pulse at point in time $t_1$ represents the dead time, which elapses until generation of the warning in the form of the yaw pulse and is a function of the system. The dead time may be reduced by cooperation of various control systems.

In the exemplary embodiment, yaw torque $M_z$ assumes a triangular course, catheti 12 and 13 of the yaw torque triangle representing the rising gradient and falling gradient, respectively, for the increase and reduction in the yaw pulse. Highest point 14 corresponds to the height of the pulse. Gradients 12 or 13 are a function of time and may be generated according to different criteria, e.g., maximized as a function of time to achieve a preferably sudden change $\Delta\omega$ in yaw rate $\dot{\psi}$ in the form of an approximated single pulse.

What is claimed is:

1. A method for warning a driver of a motor vehicle, comprising:
   detecting, using an accident detection system, a situation posing an increased risk of an accident involving the motor vehicle; and
   altering at least one driving state variable of the motor vehicle in response to the detected situation posing an increased risk of an accident, wherein:
   the at least one driving state variable includes at least one of a yaw rate and a state variable correlated with the yaw rate;
   the altering of the at least one driving state variable produces a change in the yaw rate;
   the change in the yaw rate provides a sensory warning detectable by the driver; and
   the sensory warning alerts the driver to take corrective action to avoid an accident.

2. The method as recited in claim 1, wherein the change in the yaw rate is below a predefined upper limiting value, below which the change in the yaw rate has no significant effect on transverse dynamics of the vehicle.

3. The method as recited in claim 2, wherein the change in the yaw rate is correlated with at least one of expected accident probability and expected accident severity.

4. The method as recited in claim 3, wherein the yaw rate is changed through altering of the at least one driving state variable, only if the expected accident probability exceeds a predetermined threshold value.

5. The method as recited in claim 4, wherein the change in the yaw rate is above a predefined lower limiting value, above which the change in the yaw rate is detectable by the driver.

6. The method as recited in claim 4, wherein the change in the yaw rate involves increasing the yaw rate at a maximized time-dependent rising gradient.

7. The method as recited in claim 4, wherein the change in the yaw rate involves reducing the yaw rate at a maximized time-dependent falling gradient.

8. The method as recited in claim 4, wherein the yaw rate is changed through altering of the at least one driving state variable, only if the motor vehicle is in a stable driving state.

9. A method for warning a driver of a motor vehicle, comprising:
   detecting, using an accident detection system, a situation posing an increased risk of an accident involving the motor vehicle;
   altering at least one driving state variable of the motor vehicle in response to the detected situation posing an increased risk of an accident;
   wherein:
   the at least one driving state variable includes at least one of a yaw rate and a state variable correlated with the yaw rate;
   the altering of the at least one driving state variable produces a change in the yaw rate;
   the change in the yaw rate provides a sensory warning detectable by the driver;
   the yaw rate is changed through altering of the at least one driving state variable, only if the motor vehicle is in a stable driving state; and
   the yaw rate is changed through altering of the at least one driving state variable, only when the sideslip angle of the motor vehicle is below a permissible limiting value.

10. The method as recited in claim 4, wherein the yaw rate is changed as a function of the moment of inertia of the motor vehicle about the vertical axis.

11. The method as recited in claim 4, wherein the yaw rate is changed as a function of the yaw torque about the vertical axis.

12. The method as recited in claim 4, wherein the change in the yaw rate is performed according to the following function:

$$\Delta\omega = \frac{1}{J_z} \int M_z dt$$

wherein $\Delta\omega$ is the change in the yaw rate, $J_z$ is the moment of inertia of the motor vehicle about the vertical axis, and $M_z$ is yaw torque about the vertical axis.

13. The method as recited in claim 4, wherein at least one vehicle wheel is decelerated to produce the change in the yaw rate.

14. The method as recited in claim 4, wherein driving torques are distributed among different vehicle wheels to change the yaw rate by acting upon active actuators.

15. The method as recited in claim 4, wherein the yaw rate is changed by generating an additional steering angle in an active steering system.

16. The method as recited in claim 15, wherein the additional steering angle is set in an active front-axle steering system.

17. The method as recited in claim 15, wherein the additional steering angle is set in an active rear-axle steering system.

18. The method as recited in claim 4, wherein the yaw rate is changed by adjusting a yaw angle.

19. A device for warning a driver of a motor vehicle, comprising:
   an accident detection system detecting a situation posing an increased risk of an accident involving the motor vehicle; and
   a control unit configured to alter at least one driving state variable of the motor vehicle in response to the detected situation posing an increased risk of an accident, wherein:
   the at least one driving state variable includes at least one of a yaw rate and a state variable correlated with the yaw rate;
   the altering of the at least one driving state variable produces a change in the yaw rate;
   the change in the yaw rate provides a sensory warning detectable by the driver; and
   the sensory warning alerts the driver to take corrective action to avoid an accident.

* * * * *

UNITED STATES PATENT AND TRADEMARK OFFICE
CERTIFICATE OF CORRECTION

PATENT NO. : 8,508,351 B2  Page 1 of 1
APPLICATION NO. : 12/733654
DATED : August 13, 2013
INVENTOR(S) : Roelke et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 733 days.

Signed and Sealed this
Fifteenth Day of September, 2015

Michelle K. Lee
*Director of the United States Patent and Trademark Office*